Dec. 13, 1938.   J. BEATTIE   2,140,044
CENTER STRUCTURE FOR EYEGLASSES AND SPECTACLES

Filed Feb. 5, 1937

WITNESS:

INVENTOR
James Beattie
BY
Augustus B. Stoughton
ATTORNEY.

Patented Dec. 13, 1938

2,140,044

UNITED STATES PATENT OFFICE 2,140,044

CENTER STRUCTURE FOR EYEGLASSES AND SPECTACLES

James Beattie, Philadelphia, Pa., assignor to Wall & Ochs, Philadelphia, Pa., a corporation of Pennsylvania Application February 5, 1937, Serial No. 124,219

1 Claim. (Cl. 88—45)

Objects of the present invention are to avoid breakage of the lenses in the operation of mounting them in the center structure as well as to avoid breakage and loosening of the lenses, straps and shoes during the adjustment of the glasses or spectacles and in the use of the same.

Other objects of the invention will appear from the following description and the invention, generally stated, consists in providing elongated extensions of spring stock at the bridge side of the shoes and spacing the extensions away from and out of contact with the rimless edge of the lenses from the shoes to their points of union with the ends of a connecting bridge, whereby the unions of the extensions and the bridge are in movable sliding contact with the edges of the lenses and are spaced from the points where the straps are connected to the lenses.

The invention also consists in the improvements to be presently described and finally claimed.

Figure 1:
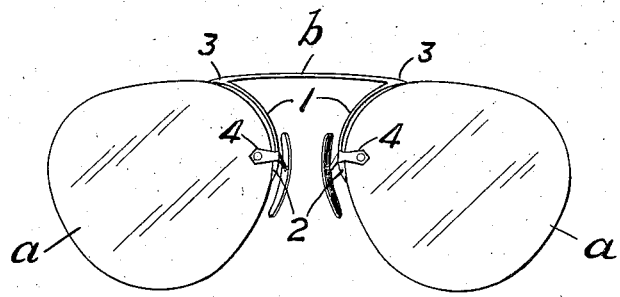
Figure 2:
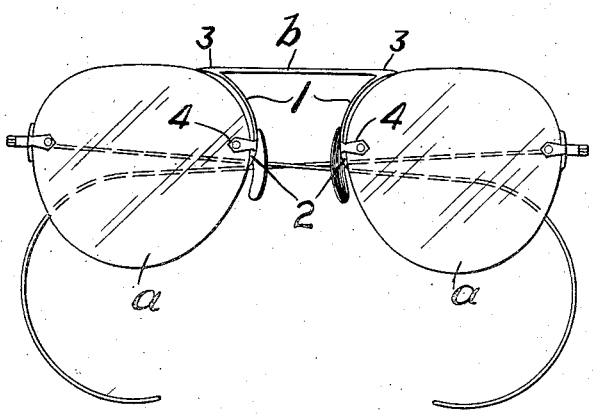

In the following description reference will be made to the accompanying drawing forming part hereof and in which, Figure 1 is a front view of eyeglasses equipped with a center structure embodying features of the invention, and Figure 2 is a similar view of spectacles equipped with a center structure embodying features of the invention.

Referring to the drawing and describing one half of the construction, since both halves are alike, I indicates an extension of spring stock at the bridge side of the shoes 2. The extension I is spaced away from and out of contact with the rimless edge of the lens a from the shoe 2 to the point indicated at 3 of union of the ends of the extension and of the connecting bridge b. From this construction it follows that the point of union 3 is in sliding movable contact with the rimless edge of the lenses. For the sake of further description it may be said that, having reference to an ordinary shoe, the half of it on the bridge side is cut away or dispensed with and replaced by the extension I of spring stock.

Since the point of union 3 of the ends of the bridge and extension are slidably movable and since the extension is of spring stock it follows that the center structure may move relatively to the lenses and in that way the latter are relieved from strain in the manufacture, adjustment and use of the glasses or spectacles.

It may be remarked that the described center structure presents an attractive appearance while at the same time it operates in the manner and performs the functions above described.

The point 4 where the strap of the shoe is attached to a lens is quite remote from the point 3 of sliding contact and this arrangement cooperates in relieving the lenses from strain.

I claim:

In rimless eyeglasses or spectacles the combination of lenses and a center structure to which the lenses are attached and which lies in the plane of the lenses, said center structure consisting of a single piece of spring stock having half shoes at its ends and a bridge at its middle and extensions between the half shoes and bridge, the half shoes being in contact with the rim of the lenses below their points of attachment to the center structure, and the points of union of the extensions and the bridge bearing in permanent sliding contact on the rim of the lenses above their points of attachment with the center structure, and the extensions being spaced from the rims of the lenses between said bearing point and the half shoes.

JAMES BEATTIE.